United States Patent Office 3,557,470
Patented Jan. 26, 1971

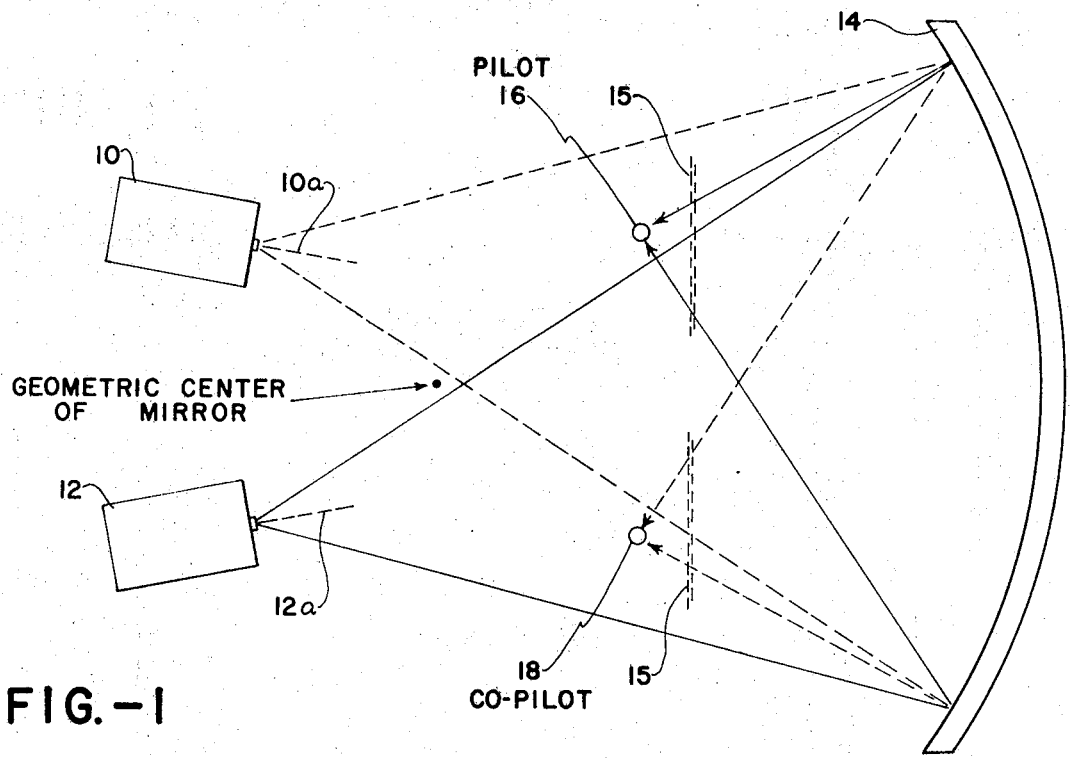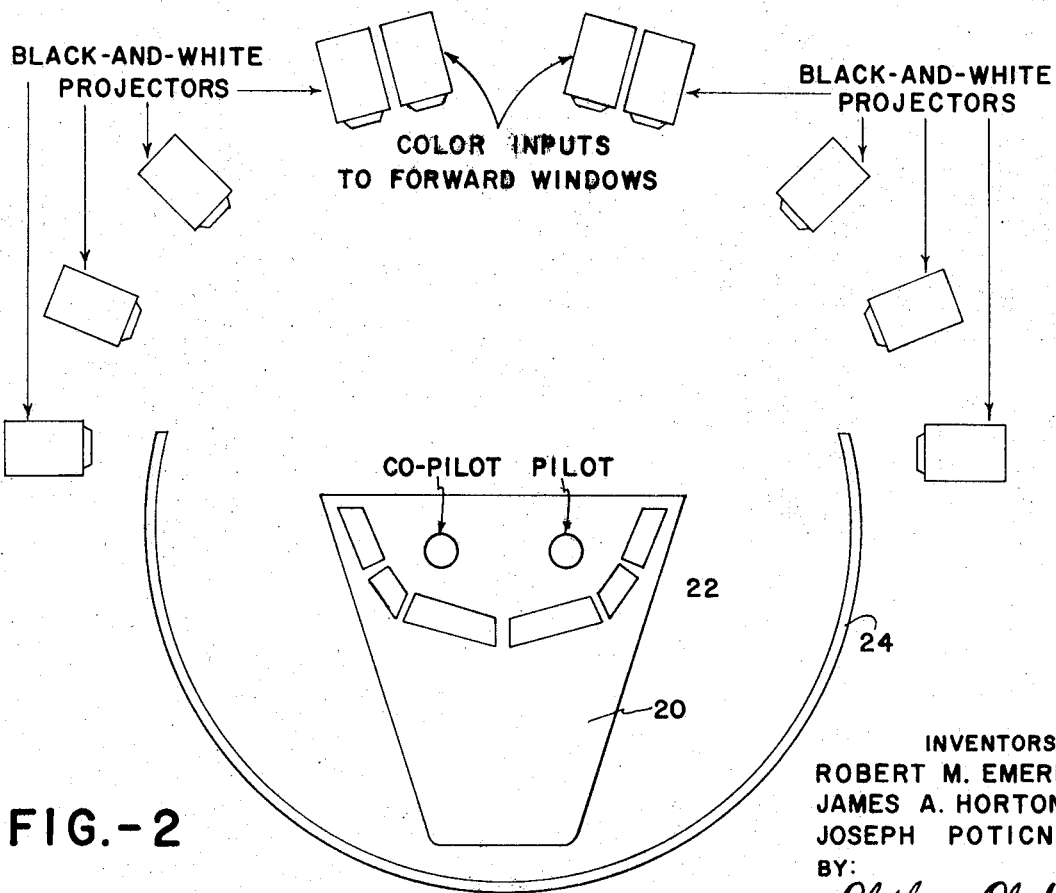

3,557,470
SIMULATOR HAVING VISUALLY INDEPENDENT
DISPLAY SYSTEM
Robert M. Emerick, Akron, James A. Horton, Cuyahoga Falls, and Joseph Poticny, Akron, Ohio, assignors to Goodyear Aerospace Corporation, Akron, Ohio, a corporation of Delaware
Filed May 22, 1968, Ser. No. 731,234
Int. Cl. G03b 29/00; G09b 9/08
U.S. Cl. 35—12
7 Claims

ABSTRACT OF THE DISCLOSURE

The invention provides a wide angle virtual image display for a two-seated aircraft simulator. The pilot and copilot, seated side by side, receive separate, geometrically correct infinity image displays through the forward windows of the aircraft, but view a common image through the side windows. Suitable projectors form an image on a large directional spherical screen which serves to collect the light and form dual exit pupils, one pupil for each individual in the simulator. Other projectors are utilized to achieve the side window displays.

Heretofore, it has been known that simulation is extremely important in training to achieve real situations in a safe environment for educational purposes. Suitable simulating systems for training aircraft pilots and copilots have not really been available to the art because of the inherent unrealism of each pilot seeing the same picture on a screen in front of them. A system is needed to make each pilot see exactly what he would see in his seat as if the aircraft were flying in a realistic situation.

The general object of the present invention is to provide a realistic simulation system for training an aircraft pilot and copilot which very closely simulates the real thing, and yet which system is not too expensive nor complex.

The aforesaid object of the invention and other objects which will become apparent as the description proceeds are achieved in a simulator system for a multi-seat aircraft which comprises a reflective directional screen, means to project a first image onto the screen in a predetermined angular relationship therewith to create an exit pupil in space in front of the screen to receive a virtual image of the image projected toward the screen, means to project a second image onto the screen in a predetermined angular relationship therewith to create a second exit pupil in space in front of the screen to receive a virtual image of the second image projected toward the screen at a spaced side by side relation with respect to the exit pupil of the first image.

For a better understanding of the invention, reference should be had to the accompanying drawings wherein:

FIG. 1 is a plan schematic illustration of a single screen, two projector system to create dual exit pupils positioned in adjacent spaced side-by-side relationship; and FIG. 2 is a plan schematic illustration of a similar concept utilizing more projectors and a larger reflecting surface to create two spaced adjacent exit pupils with image information from the front and around to at least about 90° relationship to each pupil of different yet coordinating side image information.

The wide angle, dual exit pupil, virtual image system is realized by utilizing several appropriate projection systems indicated generally by numerals 10 and 12, as seen in FIG. 1 of the drawings to form an image on a highly directional, substantially spherical screen 14. In effect the screen 14 acts as a mirror or a reflective surface. The projectors 10 and 12 might be TV projectors, conventional film projectors, or the like. The spherical screen 14 is preferably one made by Goodyear Aerospace Corporation, and described in U.S. patent application Ser. No. 710,300. The projectors 10 and 12 are mounted in alignment on axes 10a and 12a that preferably will form an angle of between 15° and 30° with relation to each other so as to provide exit pupils at laterally spaced side by side positions 16 and 18 as indicated by the solid and dotted lines respectively which indicate the path of the light projecting from systems 10 and 12 towards the screen 14.

The use of an eyepiece lens indicated by dotted lines 15 located at one focal length distance from the screen 14 is optional. The infinity image effect is obtained from the eyepiece lens which collects the light reflected off the screen. The dual exit pupils 16 and 18 are achieved by the use of the directional screen 14 which permits the projection of two images on the same section of screen at different angles of incidence, with the resulting distinct separation of viewing positions for the two images. This enables the system to be used for two observers seated side by side in an aircraft simulator, providing one exit pupil for the pilot and one for the copilot.

In FIG. 2 a more elaborate system is illustrated which comprises an actual airplane fuselage indicated by numeral 20 having six windows indicated generally by numeral 22. There are two forward windows and two on each side. The field of view of the two observers is determined by the angular field which the spherical screen 24 subtends from the eye of the pilot or copilot. They will be able to discern an image through the windows wherever they can view the screens. The proposed simulator will provide a 240° horizontal by 60° vertical field of view, the vertical field being divided into 20° above the horizon and 40° below.

This embodiment envisions utilizing eight TV projectors to project the image onto the screen in such a way as to provide each observer with the geometrically correct visual display on the respective side screens. To accomplish this, both observers must be provided with an individual display through the two forward windows. Failure to do this will result in an angular discrepancy between the visual display and the real world situation. For example, a single dead-ahead view focused on the center of the screen is viewed by both observers at some angle with respect to the true forward view. Shifting the image to make it geometrically correct for the pilot will increase the angular discrepancy seen by the copilot. This problem is eliminated by providing individual inputs for each observer through each of the forward windows. The directional characteristic of the screen makes this possible. In addition to the black and white projectors, two color projectors are also used for the forward windows. Both observers are provided with a colored view of the landing lights through the window immediately in front of them where night flying situations are simulated.

The side windows are approximately aligned with the pilot and copilots so that the angular discrepancy in their respective views of a single input will be negligible. Also, the observer seated farthest from the window will have a very limited view through it due to the narrow angular substance of the window from his eye and the fact that the other observer will be obstructing his field of view still further. Thus each of the four side windows need be supplied with only a single input which will be viewed by both observers at their virtual image pupil exits.

The necessity of providing separate inputs for each window arises from the use of large diameter lenses for the windows 22. If a single input were to be viewed through adjacent windows, the lenses would introduce a greater information gap between the two than would be experienced in the actual cockpit. This problem, however, is circumvented by the use of individual inputs for each window, with the input pre-corrected at the respective projector to deliver the correct information to the observer. The focal length of the lenses mounted in the windows are determined by the geometrical arrangement, being equal to the lens to screen separation in each instance.

The spherical screen 24 is again a highly directional, reflectance type projection screen. Normally the screen composition is a laminate of clear vinyl and aluminized Mylar with a plastic foam backing to rigidize it. It is lightweight, and its high screen gain of approximately 40 makes it especially useful for visual simulation.

The actual exit pupil in each of the systems shown in FIGS. 1 and 2 are contemplated to be designed for a 12-inch diameter pupil with the observer's head in the pupil. In all instances, every effort should be made to maintain a full 12-inch horizontal dimension, even if it is necessary by moving the projectors off axes to reduce the vertical dimension of the exit pupil. The light at the exit pupil is adjustable to infinity focus with 0.01 diopter at the center of the filed with a variance no greater than 0.07 diopter across the field.

While in accordance with the patent statutes only one best known embodiment of the invention has been illustrated and described in detail, it is to be particularly understood that the invention is not limited thereto or thereby, but that the inventive scope is defined in the appended claims.

1. A simulator system for a multi-seat aircraft which comprises
    a substantially spherical reflective directional screen,
    means to project a first image onto the screen in a predetermined angular relationship therewith to create an exit pupil in space in front of the screen to receive a virtual image of the image projected toward the screen,
    means to project a second image onto the screen in a predetermined angular relationship therewith to create a second exit pupil in space in front of the screen to receive a virtual image of the second image projected toward the screen at a spaced side by side relation with respect to the exit pupil of the first image.

2. A simulator system according to claim 1 where the images projected onto the screen overlap at an angular relation to each other of between about 15° to 30°.

3. A simulator system according to claim 1 which includes an eyepiece lens located at one focal length distance from the screen for each exit pupil to collect the light reflected off the screen.

3. A simulator system according to claim 3 which includes a cockpit, and where the eyepiece lens for each image is mounted as a window in the cockpit.

5. A simulator system according to claim 4 which includes a plurality of other laterally spaced image projection systems, and a plurality of side lenses mounted as windows in the cockpit with the projection systems aligned to produce virtual images through the side lenses in coincidence with the exit pupil on their respective side of the cockpit.

6. A simulator system according to claim 1 where the screen has a light gain of about 40.

7. A simulator system which comprises
    a highly reflective directional screen, and
    means to project at least two light images at different angles toward the screen to create virtual images of the projected images at at least two exit pupils in spaced side by side relation in front of the screen.

References Cited

UNITED STATES PATENTS

| | | | |
|---|---|---|---|
| 2,381,614 | 8/1945 | Moller et al. | 350—125 |
| 3,012,337 | 12/1961 | Spencer, Jr. et al. | 35—12 |
| 3,114,979 | 12/1963 | Fox | 35—12 |
| 3,279,313 | 10/1966 | Kowalik et al. | 350—126 |

ROBERT W. MICHELL, Primary Examiner

P. V. WILLIAMS, Assistant Examiner

U.S. Cl. X.R.

350—125; 352—131; 353—94